United States Patent [19]

McClish

[11] Patent Number: 4,882,965

[45] Date of Patent: Nov. 28, 1989

[54] DIRECTION OF BOWING DETECTION METHOD AND APPARATUS

[76] Inventor: Richard E. D. McClish, 2200 Chapdelaine apt. 1203, Ste-Foy, Quebec, Canada, G1V-4G8

[21] Appl. No.: 333,852

[22] Filed: Apr. 4, 1989

Related U.S. Application Data

[63] Continuation of Ser. No. 92,086, Sep. 2, 1987, abandoned.

[51] Int. Cl.[4] ........................ G09B 15/00; G10G 1/00; G10H 3/18

[52] U.S. Cl. ........................................ 84/1.16; 84/453; 84/477 R

[58] Field of Search ................................ 84/1.04–1.16, 84/256, 274, 453, 470 R, 477 R

[56] References Cited

U.S. PATENT DOCUMENTS

| | | | |
|---|---|---|---|
| 3,911,776 | 10/1975 | Beigel | 84/1.11 |
| 4,151,775 | 5/1979 | Merriman | 84/1.16 X |
| 4,351,216 | 9/1982 | Hamm | 84/1.15 |
| 4,730,530 | 3/1988 | Bonanno | 84/1.16 |

*Primary Examiner*—Stanley J. Witkowski

[57] ABSTRACT

An apparatus for producing a signal indicative of the direction of bowing of a musical instrument by analyzing the signal from a transducer monitoring the displacements of a bowed vibrating element in the plane of bowing. The indicative signal is stored for the entire duration of a played note or musical passage.

6 Claims, 2 Drawing Sheets

DIRECTION OF BOWING DETECTION METHOD AND APPARATUS

This application is a continuation of application Ser. No. 92,086 filed Sept. 2, 1987 and now abandoned.

TECHNICAL FIELD

This invention relates to tone processing systems and more specifically to the electronic detection of specific characteristics of tones produced by transducers of bowed musical instruments.

BACKGROUND ART

It is customary when writing sheet music for bowed musical instruments to specify the direction of bowing of each note or passage to ensure consistency of interpretation and correct articulation of the musical phrases thus annotated.

Devices capable of writing sheet music automatically in response to a tone signal from a musical instrument are known in the prior art. When a musical passage played on a bowed instrument is recorded onto sheet music using a device capable of such operation automatically, it is desirable to obtain a partition containing the bowing information along with the rest of the musical notation. This has not been the case in the past and bowing information was either lost or written in manually after the fact with the inherent possibility of error from the lack of simultaneity of the events.

The mechanics of bowing and the related motional behavior of bowed vibrating elements in musical instruments are known in the prior art.

When a bow is drawn across a vibrating element to produce a musical tone, the gripping surface of the bow displaces the vibrating element in the direction of bowing at a relatively low speed until a limit is reached where the friction between the contacting surfaces becomes insufficient to displace the vibrating element further in that direction.

If the bow continues to move in the direction of bowing,. the vibrating element slips under the bow in the opposite direction at a relatively high speed until a point is reached where the elasticity limits of the vibrating element force it to stop, and the forces of friction between the surfaces are once again sufficient to pull the vibrating element in the direction of bowing and start another similar cycle of vibration for as long as the bow is drawn across the vibrating element with sufficient speed and contact pressure to maintain the tone.

A transducer responsive to the above-mentioned displacements of a vibrating element in the plane of bowing produces a tone signal, the waveform of which resembles a sawtooth. The most vertical slope of each cycle of this waveform corresponds to the sudden slipping of the vibrating element under the bow.

This characteristic of each cycle of the tone signal appears consistently upon bowing and is independent of which note is being played.

It is therefore an object of the present invention to detect the polar direction of this rapid voltage change which is directly related to the direction of bowing, irrespectively of the frequency of the played note.

It is a further object of the present invention to produce an indication of the detection in the form of a signal, the magnitude of which is independent of the amplitude or frequency of the signal from the transducer.

It is a still further object of the present invention to provide an indication of the direction of bowing for the entire duration of the note or passage being played, including the period during which the bow leaves the vibrating element in a state of free vibration at the end of a bow stroke.

SUMMARY OF THE INVENTION

According to the invention, a transducer monitors the displacements of a bowed vibrating element such as a violin string under tension. The transducer must be positioned with respect to the instrument so that the waveform of the resulting tone reverses when the direction of bowing is reversed.

U.S. Pat. No. 3,453,920 issued to Scherer exemplifies a suitable transducer for this application in a stringed instrument. In such a transducer, the piezoelectric elements are connected so as to produce minimum sensitivity in the vertical plane. A microphone positioned so as to have its diaphragm very near the top of an acoustic instrument preferrably near the bridge, or a magnetic pickup near a ferrous vibrating element can also be used in this application. As long as the waveshape of the tone produced by the transducer, as seen on an oscilloscope, becomes recognizably inverted when the direction of bowing is reversed, there is a detectable portion of the signal which is indicative of the direction of bowing and the transducer is suitably monitoring the vibrating element for the purpose of this invention.

The preferred transducer mentioned above produces a waveform which closely approximates a sawtooth and which reverses symmetrically when the direction of bowing is reversed, even when playing in the highest positions capable of producing a musical tone. In most applications such accuracy is not required but the transducer should preferably have good high frequency response to accurately monitor the rapid motions of the vibrating element throughout its entire playable range.

It is preferable that the resonances in the transducer be low in amplitude and high in frequency to avoid creating spurious frequencies in the transducer signal, the waveform of which can be assumed to be a sawtooth, for ease of understanding of the present invention.

The signal from the transducer is applied to a slope detector in order to produce a signal in which the specific characteristics of the direction of bowing will be significantly enhanced and possibly become dominant, thus simplifying the detection process. A first function of the slope detector is to respond to the rates of voltage change occurring in each cycle of the transducer signal and convert each one into a value, either in the form of a voltage or in other forms such as a number,a frequency, etc. . A second function of the slope detector is to produce a reference value corresponding to a fixed portion of the cycle being analyzed.

It is desirable to store the information obtained from the slope detector for the entire duration of the cycle being analyzed and further until new information supersedes the preceding one. In practice, a value can be assumed valid for more than one cycle and new information generally takes more than one cycle to develop. If the slope detector produces more than one value during a cycle of the transducer signal, the required arithmetical operations are preformed to obtain a single significant value which is not directly frequency related. The significant value obtained is preferrably independent of the frequency of the played note.

The significant value is then compared to the reference value from the slope detector to find the sign or polarity of the difference between the two compared values. This sign or polarity is indicative of the direction of bowing and can be expressed as an indication of magnitude such as a voltage, a number, a frequency, etc. according to the requirements of the application requiring the information.

In practice, it is desirable to store this indication of the direction of bowing to avoid erroneous indications when in bow leaves a string vibrating, for example at the end of a bow stroke.

A data latch would typically be used if the indication is in the form of a binary voltage. The indicative signal is stored shortly after the beginning of a note and held until the end of a note.

It may also be desirable to exhibit a neutral state when no note is being played. For example, a gate or switch responding to the presence of signal from the transducer can be used to disconnect the indicative signal from the rest of the system whenever the amplitude of the trans ducer signal falls below a predetermined value.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein.

DETAILED DESCRIPTION OF THE PREFERRED EMBODIMENT

Figure 1:
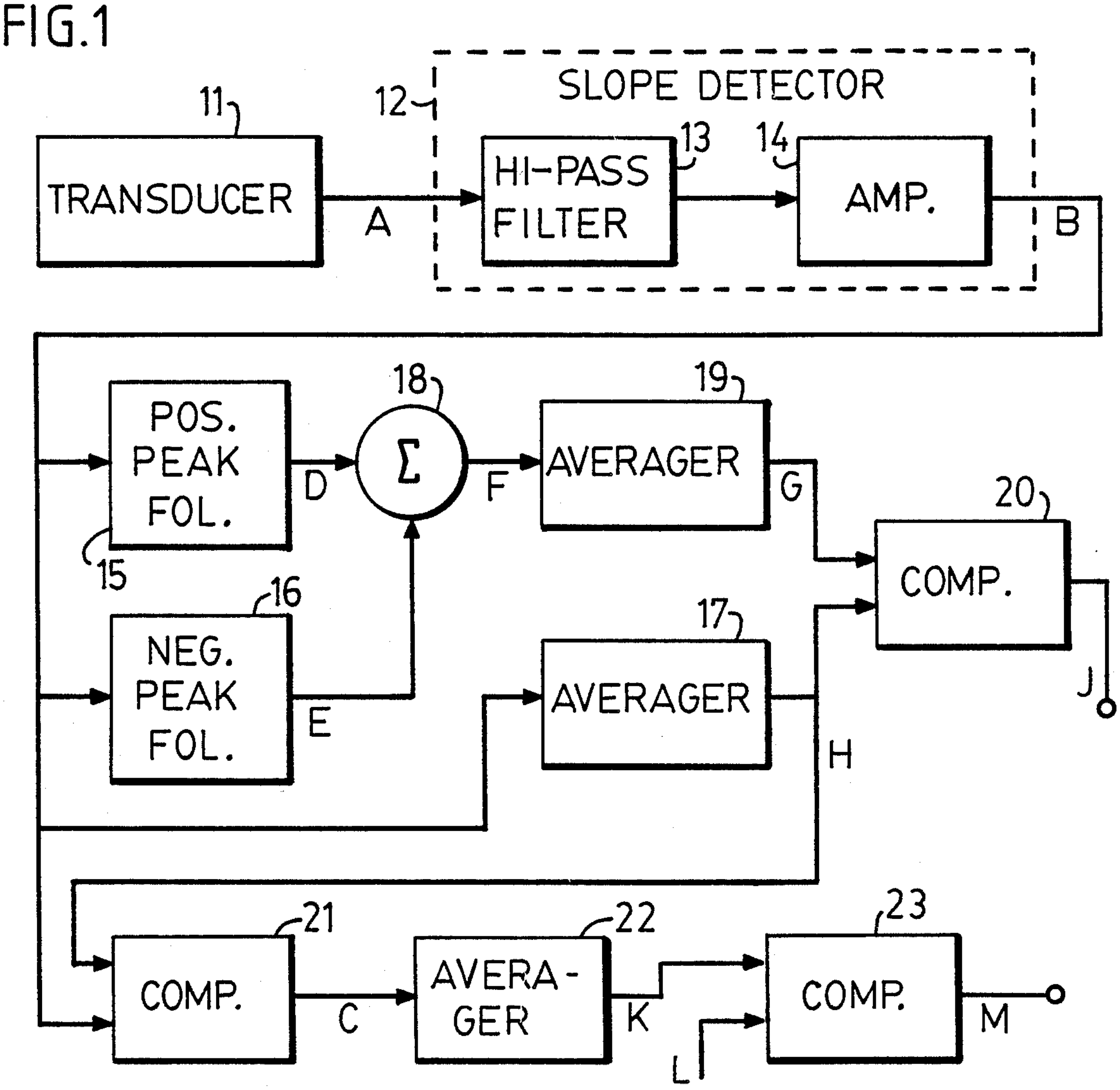
FIG. 1 is a block diagram of the portion of the present invention which provides an indication of the direction of bowing.
Figure 2:
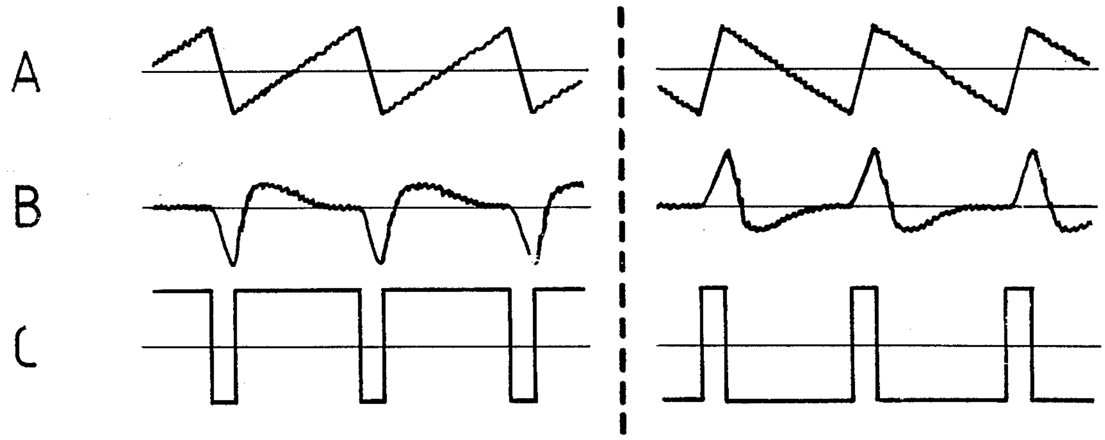
FIGS. 2A through 2C are plots of signal waveforms appearing at designated points in the apparatus of FIG. 1.

Referring to FIG. 1 of the drawings, a transducer 11 responsive to the displacements of a bowed vibrating element in the plane of bowing produces a signal A illustrated in FIG. 2A, the waveform of which resembles a sawtooth.

In spite of the presence of a small amount of friction ripple in one portion of each cycle of the waveform of FIG. 2A, it can be seen that two major voltage changes of opposite polarity occur in each cycle of signal A. These voltage changes occur at different rates, the highest of which corresponds to the slipping of the vibrating element under the bow. This is confirmed by the absence of any friction ripple in that portion of each cycle of the transducer signal A.

Signal A is applied to a slope detector 12 consisting of a high-pass filter 13 and a gain stage 14. The slope detector 12 produces a signal B illustrated in FIG. 2B, which exhibits peaks of opposite polarity, the magnitude of which substantially corresponds to the rates of voltage change occurring in transducer signal A.

In a first portion of the circuit operating in the amplitude domain, signal B is applied to a positive peak follower 15 to produce a positive voltage D, and is also applied to a negative peak follower 16 to produce a negative voltage E. Voltages D and E are stored values substantially corresponding to the rates of voltage change occurring in the transducer signal A. Signal B is also applied to an averager 17 to produce a reference voltage H by which the magnitude of the peaks can be evaluated.

Voltages D and E are of unequal magnitude with respect to voltage H since they are effectively equal to the peak voltages appearing in signal B. The polarity of the largest peak of each cycle of signal B is indicative of the direction of slipping of the vibrating element under the bow and consequently will change according to the direction of bowing.

Voltages D and E are applied respectively to the inputs of a voltage summer 18 to produce a voltage F which is effectively the difference between voltages D and E in the direction of the largest peak in each cycle of signal B.

The magnitude of voltage F depends on the amplitude of signal B, and consequently, on the amplitude of transducer signal A. It is desirable to produce an indication of fixed magnitude, irrespectively of the amplitude of signal A.

For this purpose, voltage F is smoothed by an averager 19 to produce a ripple free voltage G, the magnitude of which is independent of the frequency of the played note. Voltages G and H are applied respectively to the inputs of a voltage comparator 20 to produce a bi-state signal J, the magnitude of which is independent of the amplitude or frequency of the played note, and the state of which is indicative of the direction of bowing.

In a second portion of the circuit operating in the time domain, signal B and voltage H are applied respectively to the inputs of a voltage comparator 21 to produce a square wave C illustrated in FIG. 2C, the pulse width of which coincides with the duration of the peaks in signal B. Square wave C exhibits two states of unequal duration which are effectively two time values substantially corresponding to the rates of voltage change in the transducer signal A.

The two time values contained in each cycle of square wave C are converted into a single significant voltage value by applying square wave C to an averager 22 which effectively sums the positive and negative portions of each cycle of the square wave C and produces a significant voltage K, the value of which changes about a fixed level according to the direction of bowing.

Voltage K is applied to a first input of a voltage comparator 23. The second input of comparator 23 is referenced to a fixed voltage L which is equal to the fixed level around which the significant voltage K changes according to the direction of bowing. Comparator 23 produces a bi-state indication of the direction of bowing, voltage M. Voltages J and M can be used jointly or separately if desired.

Figure 3:
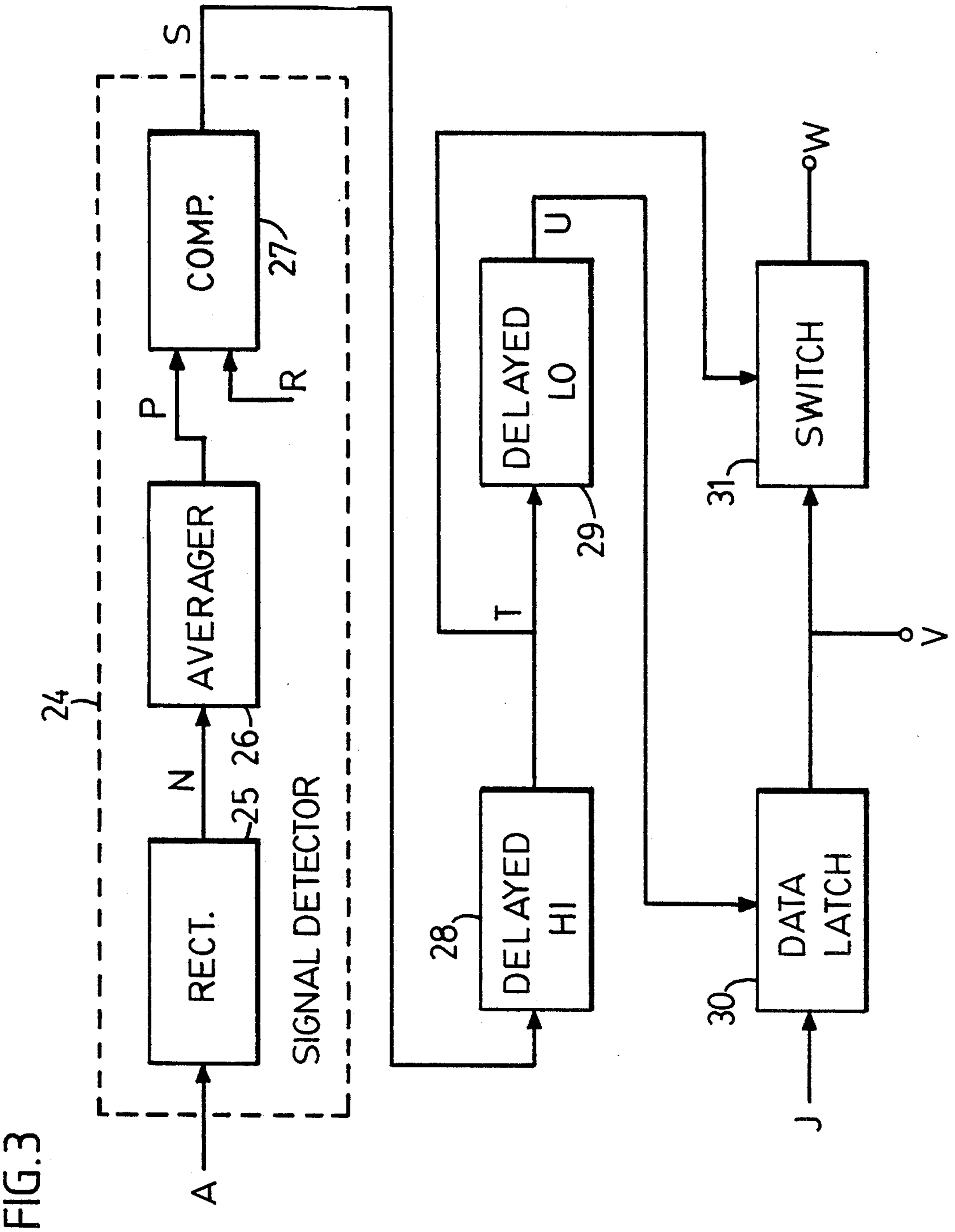
FIG. 3 is a block diagram of the portion of the present invention which is used to hold an electrical signal indicative of the direction of bowing for the entire duration of a played note or musical passage.

For simplicity and ease of understanding of the portion of the present invention illustrated in FIG. 3, voltage J only will be used as the signal indicative of the direction of bowing.

Referring now to FIG. 3, the transducer signal A is applied to a signal detector 24 comprising a rectifier 25, an averager 26 and a comparator 27, the output of which goes positive when the magnitude of voltage P which corresponds to the amplitude of the transducer signal A, becomes larger than a reference voltage R. Comparator 27 produces voltage S which is applied to a delay network 28 which delays the transition from LO to HI while the transition from HI to LO is not significantly delayed. The delay provided by delay network 28 ensures that data latch 30 and switch 31 will be activated only after signal J has become stable and exhibits the correct indication. Delay network 28 produces a voltage T which is also applied to a delay network 29 which provides a small amount of delay when voltage T goes negative to ensure that the switch 31 opens before the data latch 30 is reset. Delay network 29 produces a voltage U which activates the data latch 30. The data latch 30 produces a voltage V which is applied to the switch 31. Switch 31 produces a tri-state voltage W, the extreme states of which are indicative of the direction of bowing. The third state of voltage W is indicative of the absence of a played note.

APPLICABILITY

To use the present invention in a music writing device, the transducer signal A is fed to the instrument input of the music writing device so that the pitch and amplitude characteristics of the played note may be converted into musical notation while voltage V or W is fed to a control input which governs the synchronous notation of the direction of bowing.

The present invention may otherwise be implemented in a computer controlled music writing device in the form of logic instructions, thus minimizing the hardware costs in the device and allowing the possibility of updating older devices without any hardware modifications.

While a specific embodiment of the present invention was described and illustrated, it is clear that the use of similar functions in another form for the purpose intended here does not depart from the true spirit and scope of this invention as described in the appended claim.

What is claimed is:

1. A device to produce an indication of the direction of bowing of a vibrating element of a musical instrument which is bowed in more than one direction of bowing, said device comprising:

transducer means responsive to audio-frequency vibrations of said vibrating element in a plane determined by a direction of said bowing and producing an audio-frequency tone signal composed of audio-frequency cycles corresponding in amplitude and in frequency to said audio-frequency vibrations, each said audio-frequency cycle minimally comprising a first change in magnitude occurring at a first rate and having a first polarity, and a second change in magnitude occurring at a second rate different from said first rate and having a second polarity opposite said first polarity, means to produce a signal indicative of said first rate of said first change in magnitude of a said audio-frequency cycle of said audio-frequency tone signal, means to produce a signal indicative of said second rate of said second change in magnitude of said audio-frequency cycle of said audio-frequency tone signal, and means to produce a signal indicative of the polarity of one of said changes in magnitude of said audio-frequency cycle of said audio-frequency tone signal in response to said signals indicative of said first and of said second rates, whereby said signal indicative of said polarity is indicative of the direction of said bowing of said vibrating element.

2. The device of claim 1 further comprising means to store a said signal indicative of said polarity and produce a fixed said signal indicative of said polarity during remanent vibrations of said vibrating element immediately following said vibrations of said vibrating element caused by said bowing.

3. A device to produce an indication of the direction of bowing of a vibrating element of a musical instrument which is bowed in more than one direction of bowing, said device comprising:

transducer means responsive to audio-frequency vibrations of said vibrating element in a plane determined by a direction of said bowing and producing an audio-frequency tone signal composed of audio-frequency cycles corresponding in amplitude and in frequency to said audio-frequency vibrations, each said audio-frequency cycle minimally comprising a first change in magnitude occurring at a first rate and having a first polarity, and a second change in magnitude occurring at a second rate different from said first rate and having a second polarity opposite said first polarity, means to produce a signal indicative of a said rate of a said change in magnitude of a said audio-frequency cycle of said audio-frequency tone signal, means to produce a signal indicative of the frequency of said audio-frequency cycle of said audio-frequency tone signal, and means resposive to said signal indicative of said rate, and responsive to said signal indicative of said frequency of said audio-frequency cycle for producing a signal indicative of the polarity of one of said changes in magnitude of said auido-frequency cycle of said audio-frequency tone signal, whereby said signal indicative of said polarity is indicative of the direction of said bowing of said vibrating element.

4. The device of claim 1 wherein said signal indicative of a said rate is indicative of a duration of a said change in magnitude.

5. The device of claim 1 wherein a square wave signal is indicative of a said rate and indicative of the frequency of a said cycle of said transducer signal.

6. The device of claim 3 further comprising means to store a said signal indicative of said polarity and produce a fixed said signal indicative of said polarity during remanent vibrations of said vibrating element immediately following said vibrations of said vibrating element caused by said bowing.

* * * * *